J. R. ROBBINS.
SOIL PULVERIZER.
APPLICATION FILED NOV. 26, 1913.

1,176,098.

Patented Mar. 21, 1916.
3 SHEETS—SHEET 1.

Witnesses

Inventor
J. R. Robbins,
By Victor J. Evans
Attorney

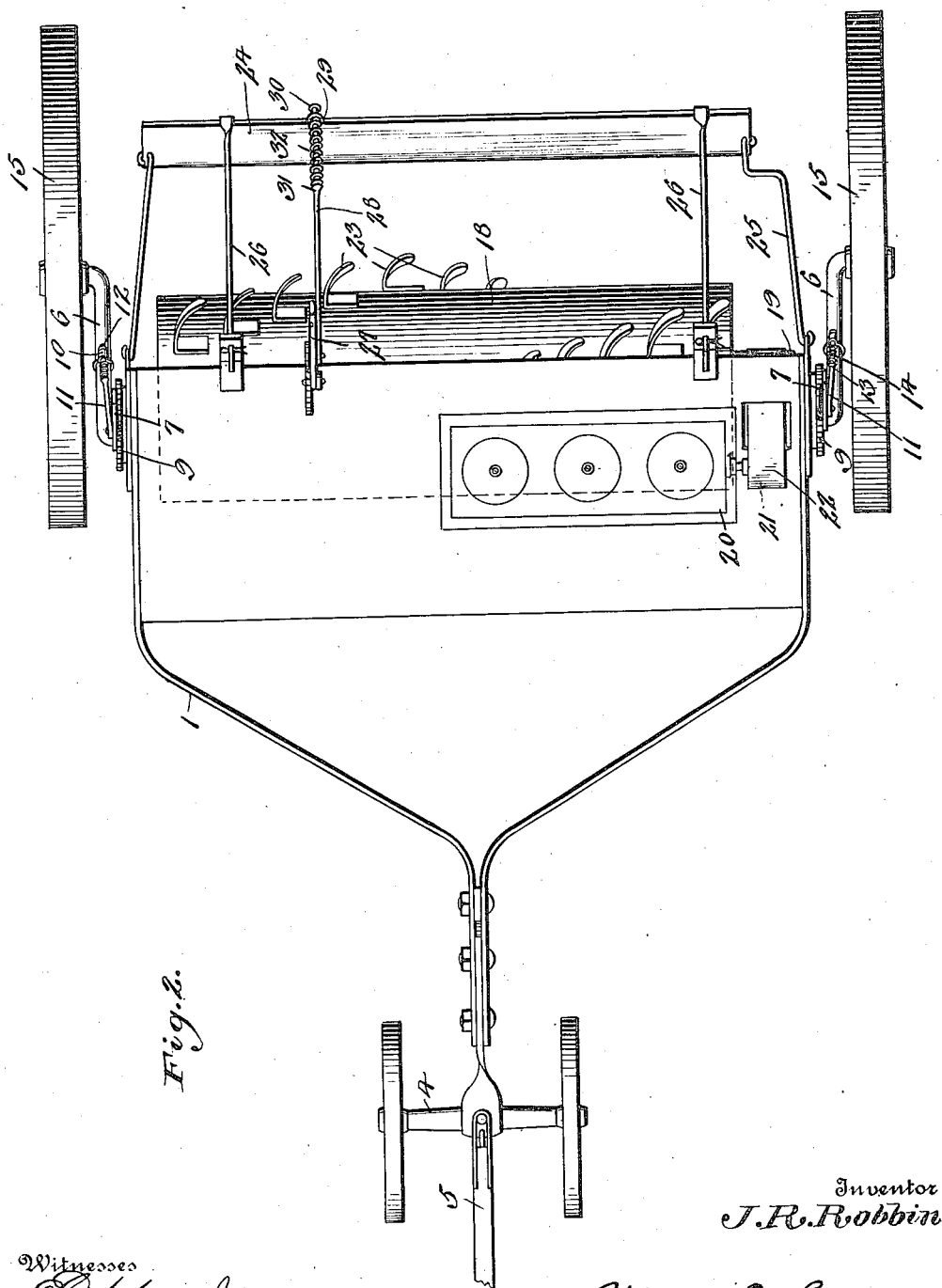

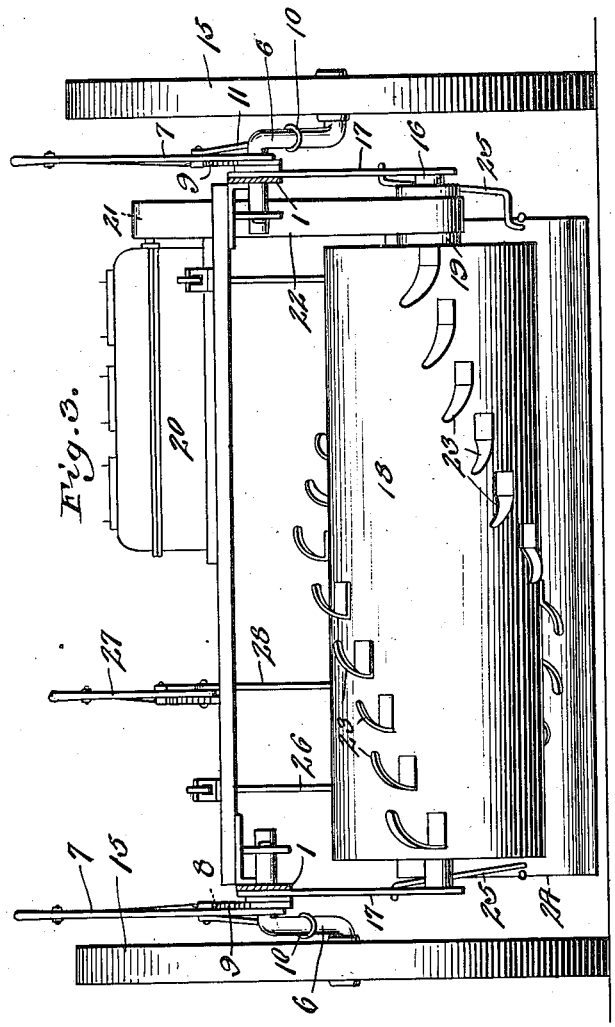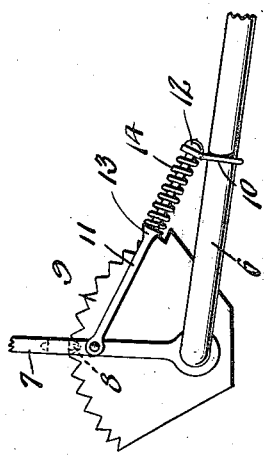

UNITED STATES PATENT OFFICE.

JOHN ROSCOE ROBBINS, OF JENNINGS, LOUISIANA.

SOIL-PULVERIZER.

1,176,098.  Specification of Letters Patent.  Patented Mar. 21, 1916.

Application filed November 26, 1913. Serial No. 803,317.

*To all whom it may concern:*

Be it known that I, JOHN R. ROBBINS, a citizen of the United States, residing at Jennings, in the parish of Jefferson Davis and State of Louisiana, have invented new and useful Improvements in Soil-Pulverizers, of which the following is a specification.

This invention relates to soil pulverizers and it consists in the novel features hereinafter described and claimed.

An object of the invention is to provide a pulverizer of simple and durable structure adapted to be drawn over the ground by draft animals and which is provided with a rotating drum carrying soil engaging elements an engine or motor being mounted upon the frame of the pulverizer for rotating the said drum as the pulverizer moves over the fields. The soil engaging members upon the drum are arranged so that they tend to eliminate side draft of the machine as the same is moved over the ground and means is provided for leveling or smoothing the soil the said means being located behind the said drum and soil engaging elements.

With the above object in view the pulverizer includes a frame supported at its forward end upon a dirigible truck. Crank axles are pivoted at the rear portion of the frame and means are provided for holding the said axles at adjusted positions. Ground wheels are journaled upon the axle. A drum is journaled at the rear portion of the frame and carries soil engaging elements arranged in spiral rows, the said elements being twisted or curved laterally and the elements in one row being twisted or curved in the opposite direction from the elements in the next adjacent row. An engine is mounted upon the frame and is adapted to rotate the drum. A leveling or smoothing blade is carried behind the drum and means is provided for raising and lowering the said blade.

Figure 1:
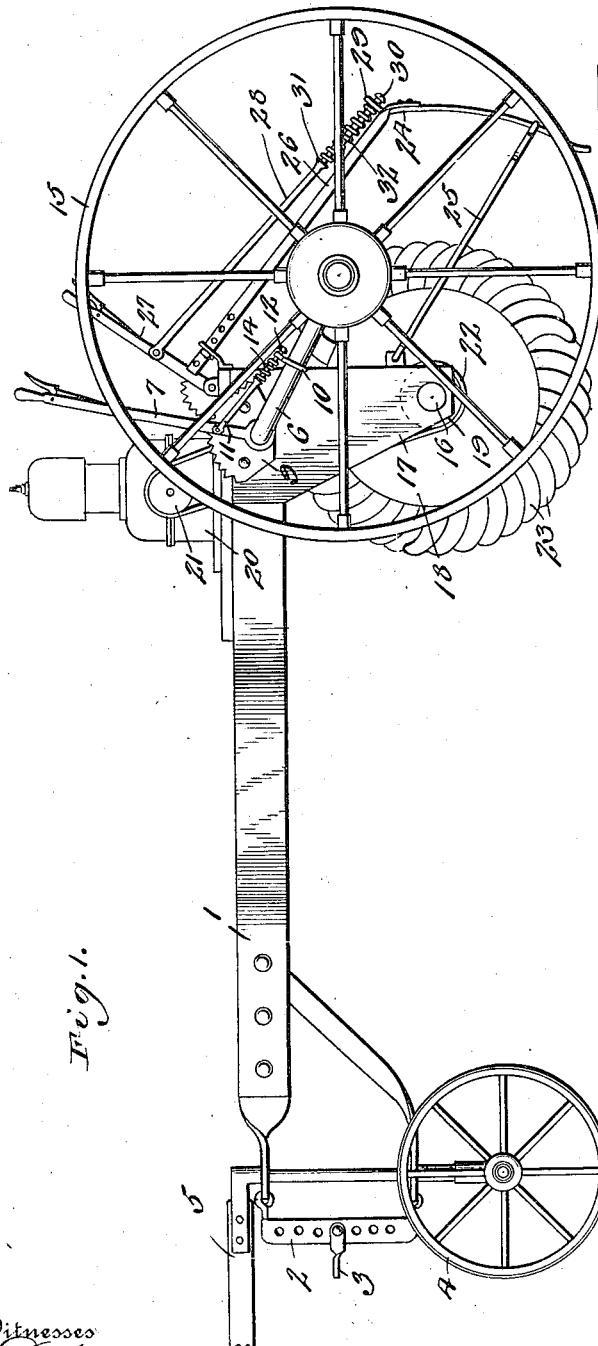
Figure 5:
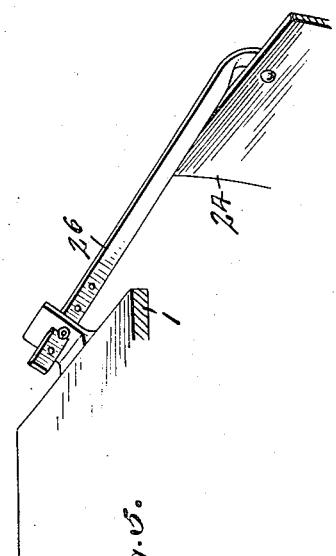

In the accompanying drawing:—Figure 1 is a side elevation of the pulverizer. Fig. 2 is a top plan view of the same. Fig. 3 is a transverse sectional view of the same. The other figures are detailed views of the several features thereof.

The machine comprises a frame 1 which is provided at its forward end with a vertically disposed bar 2 upon which is adjustably mounted a clevis 3. The draft animals may be connected with the clevis in any suitable manner. A truck 4 is pivoted at the forward portion of the frame 1 and supports the forward part of the said frame and the said truck carries a guiding tongue 5. Crank axles 6 are pivoted at the sides and rear portion of the frame 1 and are adjustable independent of each other. A lever 7 is fixed to each axle 6 and each lever is provided with a spring pressed pawl 8 adapted to engage a segment 9 mounted upon the frame 1. Eyes 10 are mounted upon the intermediate portions of the axles 6 and rods 11 pivotally attached at their forward ends to the levers passed through the said eyes and are provided at their rear ends with heads 12 which are adapted to bear against the rear surfaces of the eyes 10 when the levers 7 are swung in a forward direction. Stops 13 are mounted upon the intermediate portions of the rods 7 and springs 14 are interposed between the said stops and the forward surfaces of the eyes 10 and serve to resiliently hold the axles 6 with relation to the levers. Ground wheels 15 are journaled upon the lower rear ends of the axles 6 and support the rear portion of the frame 1. Therefore it will be seen that by means of interposing the springs 14 between the eyes 10 and stops 13 the frame 1 is resiliently supported at its rear end and at the same time when the levers 7 are swung in a forward direction the rear portion of the frame 1 is lowered with relation to the surface of the ground and by using the said levers independently the frame 1 may be lowered at one side to a greater extent than at the other side.

A shaft 16 is journaled between brackets 17 which depend from the rear portions of the frame 1 and a drum 18 is mounted upon the said shaft. A pulley wheel 19 is also mounted upon the shaft 16 and an engine 20, of any approved pattern, is mounted upon the frame 1. A pulley wheel 21 is mounted upon the shaft of the engine 20 and a belt or chain 22 is trained around the pulleys 19 and 21 and is adapted to transmit rotary movement from the shaft of the engine 20 to the shaft 16 and the drum 18.

Soil engaging members 23 are mounted upon the periphery of the drum and these members may be in the form of teeth blades or similar devices. The teeth 23 are arranged in spiral rows upon the drum and the said teeth or members 23 are turned longitudinally. All of the members 23 in the same row are curved in the same direction but the members in one row are curved in the opposite direction from the members in the next adjacent row. The rows of members 23 are sufficiently close together so that the members of two adjacent rows engage the soil simultaneously and consequently the curvature of one row in contact with the soil will have a tendency to counteract the curvature of the next adjacent row in contact with the soil and for this reason a tendency to side draft of the pulverizer is eliminated.

A soil leveler or smoother is behind the drum and the said leveler or smoother is in the form of a curved blade 24. Links 25 are pivotally connected at their forward ends with the lower portions of the brackets 17 and are pivotally connected at their rear ends with the end portions of the blade 24. Links 26 are pivotally connected at their rear ends with the upper corner portions of the blade 24 and the said links at their forward ends are adjustably connected with the rear portion of the frame 1. A lever 27 is fulcrumed upon the frame 1 and is provided with a pivoted rod 28 which passes through an eye 29 mounted upon the blade 24. The rod 28 is provided at its rear end with a head 30 and at a point between its ends with a stop 31. A spring 32 is interposed between the stop 31 and the side of the eye 29 and tends to hold the blade 24 toward the ground although the said blade may move in any upward direction against the tension of the spring 32 when it encounters obstructions at the surface of the soil. By using the lever 27 the blade 24 may be raised or lowered and held at an adjusted position. Therefore it will be seen that as the device is moved over the surface of the soil and drawn by draft animals the drum 18 is rotated from the engine 20 and the soil engaging elements carried by the drum will reduce the surface of the soil to a desired pulverized state and the draft animals are relieved of the work of reducing the soil inasmuch as it is necessary only that they draw the pulverizer over the field. Furthermore the parts are so arranged as to eliminate side draft of the device and the pulverizer is further provided with means for leveling or smoothing the soil and for leaving the same in proper condition for planting.

Having described the invention what is claimed is:—

A pulverizer comprising a wheel mounted frame, a drum journaled upon the frame, an engine mounted upon the frame and operatively connected with the drum to rotate the same, means for raising and lowering the opposite side portions of the frame at the opposite ends of the drum with relation to the ground, independently of each other, soil engaging elements carried by the drum, and a blade carried by the frame and located behind the soil engaging element and means for resiliently holding the blade at an adjusted position with relation to the frame.

In testimony whereof I affix my signature in presence of two witnesses.

JOHN ROSCOE ROBBINS.

Witnesses:
W. H. ADAMS,
E. T. LEWIS.